(12) United States Patent  
Meunier

(10) Patent No.: US 7,314,216 B2  
(45) Date of Patent: Jan. 1, 2008

(54) METHOD FOR MAKING A UNIQUE CODE ONTO A PAPER EDGE

(75) Inventor: Jean-Luc Meunier, Saint Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 323 days.

(21) Appl. No.: 11/109,178

(22) Filed: Apr. 19, 2005

(65) Prior Publication Data

US 2006/0231997 A1   Oct. 19, 2006

(51) Int. Cl.
  *B65H 33/00* (2006.01)
(52) U.S. Cl. .................. 270/52.02; 270/1.02; 270/1.03; 270/52.03
(58) Field of Classification Search .............. 270/1.02, 270/1.03, 52.02, 52.03
  See application file for complete search history.

(56) References Cited

U.S. PATENT DOCUMENTS

| 5,085,417 | A | 2/1992 | Copham |
| 6,335,084 | B1 | 1/2002 | Biegelsen et al. |
| 6,499,665 | B1 | 12/2002 | Meunier et al. |
| 6,582,138 | B1 | 6/2003 | Meunier et al. |
| 6,585,163 | B1 | 7/2003 | Meunier et al. |
| 6,604,875 | B2 | 8/2003 | Meunier et al. |
| 6,637,666 | B2 | 10/2003 | Meunier |
| 2003/0072019 | A1* | 4/2003 | Haines et al. .............. 358/1.12 |
| 2003/0112479 | A1* | 6/2003 | Huber et al. ................ 358/498 |

* cited by examiner

*Primary Examiner*—Gene O. Crawford  
*Assistant Examiner*—Leslie A Nicholson, III  
(74) *Attorney, Agent, or Firm*—Jeannette Walder

(57) ABSTRACT

A method of marking a unique code onto an edge of a sheet of material takes N stacks of sheet material, each stack having N1 sheets; prints a barcode uniquely identifying each stack on at least one edge of the stack so that each sheet of sheet material in the stack has the barcode printed on its edge. N1 stacks of sheet material are formed by collating the N stacks of sheet, wherein each of the N1 stacks has N sheets of sheet material, one sheet from each of the N stacks of sheet material. A second barcode uniquely identifying each of the N1 stacks is printed on at least one edge of the stack so that each sheet of sheet material in the stack has the barcode printed on its edge.

3 Claims, 3 Drawing Sheets

METHOD FOR MAKING A UNIQUE CODE ONTO A PAPER EDGE

BACKGROUND

Despite the publicity about the paperless office, paper remains an important media in today's working environment. Many efforts have been made to integrate paper documents with computer-based information systems. These efforts generally involve two scenarios. The first scenario involves scanning an existing physical document to create a digital copy, assigning a digital file name and then managing the digital copy as any other digital file. The second scenario involves creation of a physical document from an exiting digital document or file such as by printing. To aid in the integration process, a barcode or a Dataglyph may be printed or otherwise attached to a physical document. Dataglyphs are generally less visually disruptive than barcodes. Both barcodes and Dataglyphs provide a means for the computer to grasp intentionally printed information on the paper document. Since both are generally applied at the time the information is recorded on the sheet of paper (but may be applied later through the use of an adhesive label), both generally appear on the same face of the sheet of paper as the recorded information.

The use of edge marking of sheet materials has been proposed for various applications. U.S. Pat. No. 5,085,417, issued Feb. 4, 1992, to Copham, for "Method of Encoding Stacks of Printed Material", describes a process for using edge markings to identify one customer's order for form checks from another customer's. During manufacture of a sheet of checks, a coded image is provided at the cutting boundaries of the stock sheets, so that when the checks are cut from the stock, an identification code appears on the checks when viewed from the edge. An edge-visible code is obtained by cutting the paper precisely where marks are located. A different code is provided for each customer to enable workers to look at the stacked check books at the edge to determine if another customer's checks were erroneously placed. Each check in a stack of checks for a particular customer has the same edge code as all other checks for that customer; the edge code is not unique from check to check.

U.S. Pat. No. 6,585,163, issued Jul. 1, 2003, to Meunier et al., for "Encoded Sheet Material and System for Processing" (the '163 patent), describes an encoded sheet material in which the edge of the material has indicia arranged thereon to form a code uniquely identifying the sheet of material. The '163 patent also describes a system for processing these codes and various methods for marking the edge of each sheet of paper at paper production time, in order to uniquely identify each ream and each sheet in the ream.

U.S. Pat. No. 6,499,665, issued Dec. 31, 2002, to Meunier et al., for "Method for Indexing and Retrieval of Physical Documents", describes a method and system for managing and retrieving a physical document having a unique edge code.

One method described in the '163 patent marks the edge of each sheet of paper (stacked in a ream) at paper production time, in order to uniquely identify each ream and each sheet in the ream. The proposed coding scheme combines a barcode for identifying the ream and a so-called 'offset-line' for identifying each sheet in the ream. This marking method enables an entire ream of paper to be marked at once. However, codes created using this method are sometimes difficult to read with precision (due to the location of the offset measure). It was also sometimes difficult to mark more than one edge on the ream at the same time using this method; vertically aligning the slope lines on all four edges (in order to apply the same code on all edges) can be difficult.

U.S. Pat. No. 6,637,666, issued Oct. 28, 2003, to Meunier, for "Coding Scheme for Encoded Sheet Material", describes how a Vernier-based pattern can improve on the readability of the offset measure used in the '163 patent. U.S. Pat. No. 6,637,666 describes an edge coding scheme for an encoded sheet material including an offset mark located at an offset distance from a reference mark on the edge of the sheet of material and a plurality of equally spaced clock marks disposed along the edge, such that the offset distance can be approximated by the product of the number of clock marks between the reference mark and the offset mark times the distance between successive clock marks. Another edge coding scheme includes coincidence between a first plurality of equally spaced apart clock marks and a second plurality of equally spaced Vernier marks, where the second plurality is less than the first plurality.

U.S. Pat. No. 6,582,138, issued Jun. 24, 2003, to Meunier et al., for "Authenticated Sheet Material", and U.S. Pat. No. 6,604,875, issued Aug. 12, 2003, to Meunier et al., for "Authenticated Sheet Material", describe a method of creating an authenticable sheet of material including marking an edge of the sheet of material with a unique code, measuring a physical property of the materials, recording the measured physical property of the sheet of material in a database indexed by the edge code. To verify the validity of a sheet of material, the edge code is read, the physical property is measured and the measured value compared with the stored value in the database associated with the edge code. If the two values are substantially equal, the sheet of material is authentic.

U.S. Pat. No. 6,335,084, issued Jan. 1, 2002, to Biegelsen et al., for "Encoded Sheet Material and Sheet Processing Apparatus Using Encoded Sheet Material", describes premarking of edges of paper reams/stacks (during manufacture) with information related to the paper's physical properties (e.g., its weight, color). This encoded information is read and used by printers (and other recording devices which record information on the faces of the sheet material) when selecting paper from paper trays.

It would be desirable to have a method which would permit easier creation of unique codes on up to four edges of a sheet of material. It would be desirable to have a method which would permit code creation at paper production time.

SUMMARY

Disclosed herein in embodiments is a method of marking a machine-readable code on the edges of sheet material at production time. The method described herein uses barcodes for both the ream identifier and the sheet identifier, thus enabling marking of up to four edges at production time while minimizing synchronization issues. The method of marking a machine-readable code on the sheet edges at paper production time described herein involves consecutive markings on the ream edge with some sheet rearrangement in the ream in between.

A method of marking a unique code onto an edge of a sheet of material, according to one embodiment, includes providing N stacks of sheet material, each stack having N1 sheets of sheet material; defining a unique first identification code for each of the N stacks of sheet material; for each of the N stacks, printing a barcode corresponding to that stack's unique first identification code on at least one edge of the stack so that each sheet of sheet material in the stack has the barcode printed on its edge; collating the N stacks of sheet material to form N1 stacks, wherein each of the N1 stacks has N sheets of sheet material, one sheet from each of the N stacks of sheet material; defining a unique second identification code for each of the N1 stacks of sheet material; for each of the N1 stacks, printing a barcode corresponding to that stack's unique identification code on at least one edge of the stack so that each sheet of sheet material in the stack has the barcode printed on its edge; and wherein each sheet of material in each of the N1 stacks has indicia arranged on at least one edge to form a code uniquely identifying the sheet of material.

A method of marking a unique code onto an edge of a sheet of material, according to another embodiment, includes providing N1 stacks of sheet material, each stack having N2 sheets of sheet material, where N1 times a number N2=N; defining a unique first identification code for each of the N1 stacks of sheet material; for each of the N1 stacks, printing a barcode corresponding to that stack's unique first identification code on at least one edge of the stack so that each sheet of sheet material in the stack has the barcode printed on its edge; collating the N1 stacks of sheet material to form N2 stacks, wherein each of the N2 collated stacks has N1 sheets of sheet material, one sheet from each of the N1 stacks of sheet material; defining a unique second identification code for each of the N2 stacks of sheet material; for each of the N2 stacks, printing a barcode corresponding to that stack's unique identification code on at least one edge of the stack so that each sheet of sheet material in the stack has the barcode printed on its edge; forming a single ream comprising the N2 stacks; printing a third identification code on at least one edge of the ream so that each sheet of sheet material in the ream has the barcode printed on its edge; and wherein each sheet of material in the ream has indicia arranged on a least one edge to form a code uniquely identifying the sheet of material.

Although the methods described require some paper manipulation at the marking or printing stage, the methods provide some features over prior marking techniques. The methods enable the same code value to be reliably marked on all four edges of the sheet of material. In another embodiment, for some applications, a separate code can be marked on each of the four edges so that the sheet orientation can be determined. The codes can be exclusively composed of barcode, and thus benefit from both barcode robustness and the large industrial expertise and infrastructure regarding scanning and decoding of barcodes.

DETAILED DESCRIPTION

Figure 1:
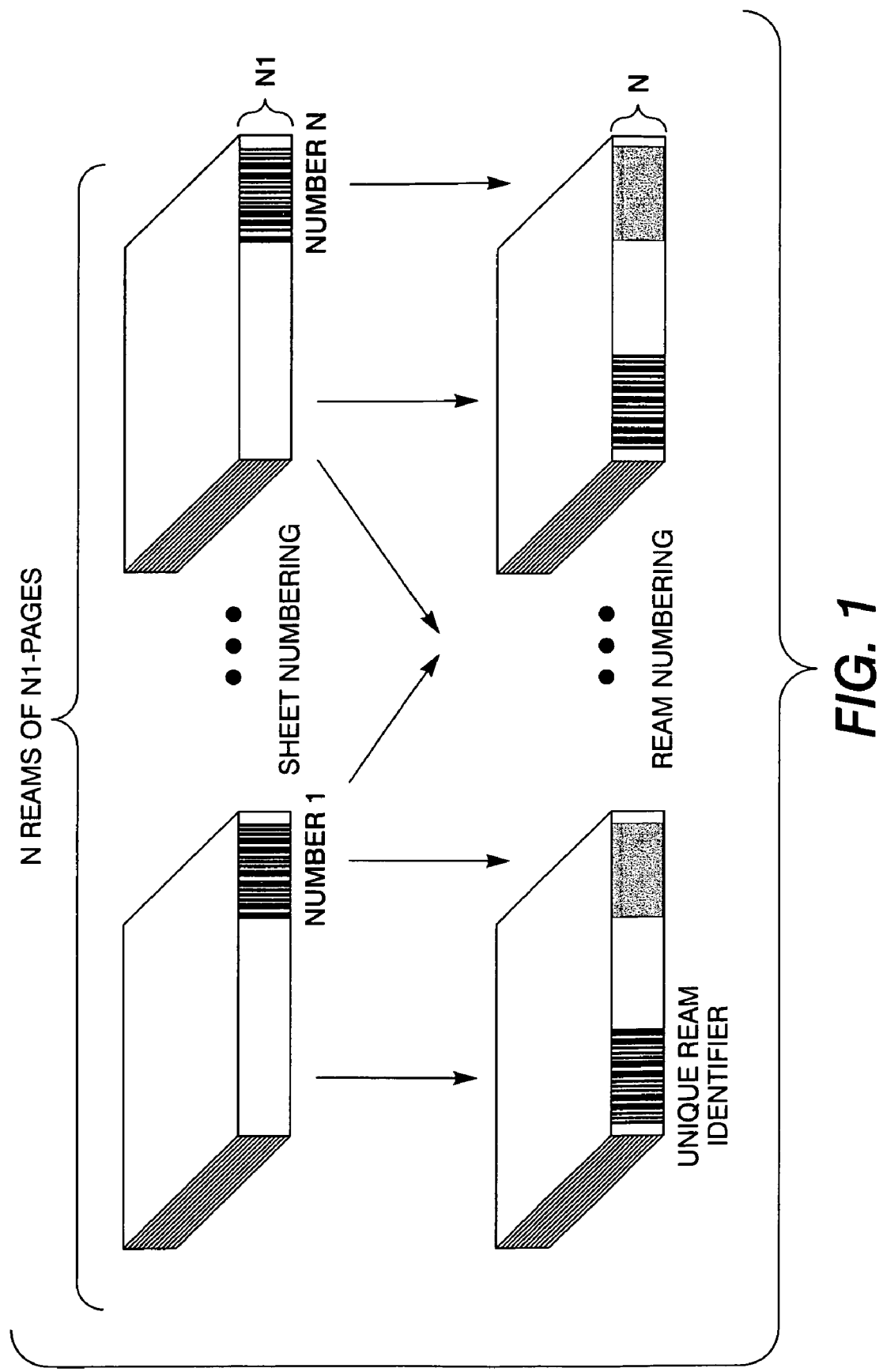
FIG. 1 is a schematic of a method of edge marking.

Most sheets of material, such as paper sheets have six faces, two of them being commonly used: the so-called recto (first surface) and verso (second surface). The four other faces, the edges, may be used to uniquely identify each sheet and, optionally, the ream it comes, manufacturer, orientation, and so on. If a ream identifier is used as part of the unique sheet code, each sheet in the ream will receive the same unique ream identifier, in addition to a unique sheet identifier. The identifiers can be marked with visible or invisible ink.

Typical A4 paper sold today presents on the long and short edges a combined edge surface of $297 \times 0.1$ mm$^2$ and $210 \times 0.1$ mm$^2$, respectively. A robust code can be easily devised to fit within this size constraint. A robust code is one which can be easily read on the edge of a single sheet of material and also affords a sufficiently large number of codes for the anticipated amount of sheets of material to be used. For example, a 64 bit long code made of 1 mm wide bars on a 2 mm grid would require 128 mm, which leaves enough room (say 64 mm for 32 bits of error code) for error correction code. In total this code (with error correction) would require 192 mm, and would also fit on letter size sheets (8½ inches by 11 inches). A typical edge thickness of 0.1 mm is sufficient height to write the bar constituting the code. For instance, to give an order of magnitude, the dots of a 600 dpi printer are 0.04 mm high. Two of these dots fit on the edge height of 0.1 mm. Thus the edge surface of typical paper sheets is thick and long enough to hold the example robust codes. A 64 bit long code provides enough unique codes to enable each inhabitant of the earth to consume 80,000 sheets of per (material) per day for over 100 years.

Referring to FIG. 1, a schematic diagram of a method of marking a unique code onto an edge of a sheet of material is shown. Consider a ream of sheets of material. In most cases, the number of sheets in a ream equals 500 sheets. Although it may be possible to print directly on a single edge of a sheet of material (such as with an ultra-fine laser), the method described in FIG. 1 prints on the combined edges of all sheets in a ream (or stack). Referring to FIG. 1, in step 1, N reams of material are provided, each ream has N1 sheets of material. Each ream of the N reams has a unique code associated with it. These unique codes will become the sheet identifier codes. The codes may be chosen to be sequential or not. In this embodiment, the codes are referred to as N sequential codes, from the first code to the Nth code. The codes will be printed as a barcode on at least one edge of the corresponding ream, the first code will be printed on the first ream, the second code on the second ream, etc., until the Nth code is printed on the Nth ream. The codes will be large enough, so that when combined with the ream identifier code, each individual sheet of material in all of the N reams will have a unique code from all other sheets of material. The sheet identifier codes may be printed towards one end of the selected edge to facilitate printing on the second identifier code described below.

In step 2, N1 new reams are built by collating sheets from each of the N marked reams in step 1. N1 new reams are built by taking one sheet from each of the previously marked N reams. Sheets are grabbed in the same fixed order from all marked reams, e.g., top-down. In the new N1 reams, each sheet in the ream has a different sheet identifier from all other sheets in the ream. In step 3, each of the newly constituted N1 reams has a unique ream identifier printed on at least one edge. The ream identifier codes may be chosen to be sequential or not. In this embodiment, the ream identifier codes are referred to as N1 sequential codes, from the first code to the N1th code.

These new N1 reams are now constituted by sheets holding a sheet identifier and a ream identifier in the range $[0, \infty]$, unique among all reams and among all sheets. The range is not infinite, but is bound by the coding limit.

Figure 2:
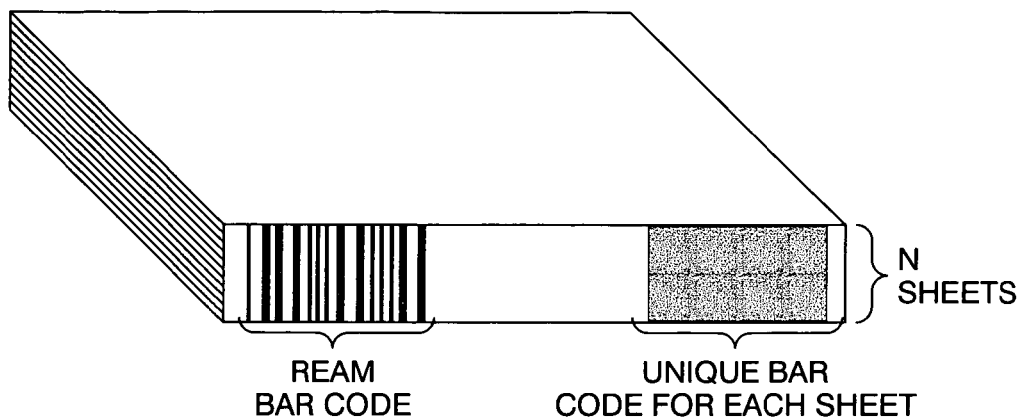
FIG. 2 is a diagram of an edge of ream produced using the method described in FIG. 1.

Eventually, each sheet holds two barcodes on its edge: the first barcode gives the ream identifier; the second gives the sheet number in the ream. FIG. 2 shows an edge view of one of the N1 reams that has been marked with a unique ream barcode on one end. Note that each sheet has a different barcode (on the other end).

Figure 3:
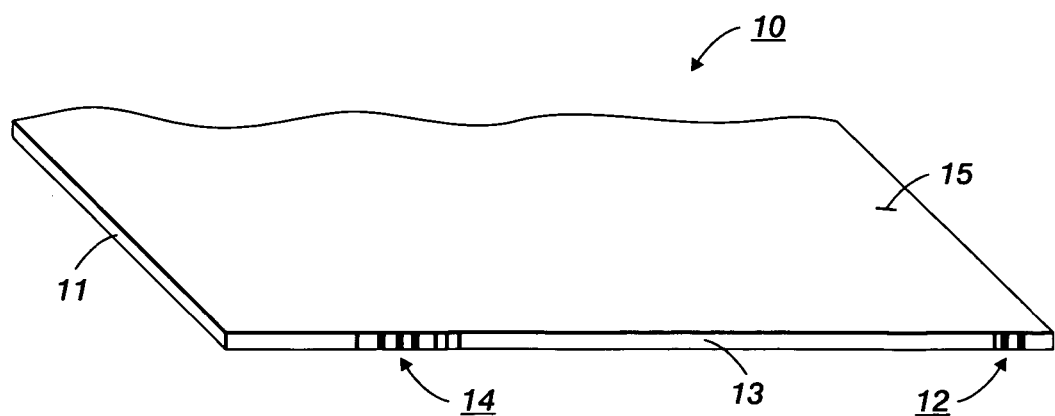
FIG. 3 is an exemplary sheet of material with edge marking.

The combination of the aggregated ream identifier and sheet identifier uniquely identify each sheet of material. Note that these marks may be invisible to the human eye if they are marked with invisible ink, or semi-visible. Referring to FIG. 3, a sheet of material, such as paper, 10 includes long edge 13 and short edge 11. Long edge 13 includes ream identifier 14 and unique sheet identifier 12. While both identifiers are shown in FIG. 1 as bars, other forms of markings may be used, such as diagonal lines, dots and the like. These marks may be visible or invisible. The examples in FIG. 2 and FIG. 3 show printing the code on a single edge. The method may be applied to mark the same code (e.g., ream and sheet identifiers) on two, three or all four edges of the ream and therefore on the four edges of each sheet. It can be a key feature in certain applications. Alternatively, the ream identifier can be printed on one edge with the sheet identifier being printed on another edge. Or, the ream identifier can be printed on two edges, with the sheet identifier printed on the remaining two edges.

Although any type of marking may be used, the method described uses barcodes for the following reasons. Because of the vertical nature of a barcode, the same barcode can be conveniently applied on the edge of an entire ream, therefore marking each sheet in the ream with the same code. Barcodes are compact enough and can be self-checking or include error-detection. For example, the length of a Code39 barcode containing 3 characters in the range [1, 43] is approximately of 50 mm (2000 mils, as 1 mil=$\frac{1}{1000}$ inch). Its range is [1, 79507] (Code39 C=3 X=20 mils N=3.0 I=X— these characteristics are those of a quite large and very robust barcode.)

By marking sheets of material at production time with industrial means, invisible inks, fluorescent dyes or other technical inks may be used (in addition to standard visible inks or a combination of visible and invisible inks). While it is anticipated that most sheets of material will be pre-marked, i.e., during manufacture and before any information is recorded on the surface, pre-marking is not required. Edges may be marked with a code after a sheet of material has been printed or recorded with information. Edge marking after information is recorded is useful for existing physical documents, such as reports, articles, magazines, books, etc.

One application for printing a code on all four edges of each sheet of material can be used to identify not only each sheet but also its orientation. This can be achieved by the following modification of the method. The sheet numbering differentiates each of the four edges, for instance by associating consecutive numbers with each of the edges. One simple technique would be to print a third code on each of the four edges of the collated reams: one number for identifying each of the edges. Alternatively, the edge orientation can be combined with the sheet identifier. In this case, the range of consecutive numbers for the four edges becomes [1, 4*N] instead of [1, N]. Given a sheet, its edge numbering modulo 4 is one of 0, 1, 2 or 3. By convention, the code identifying a sheet is, say, on its right edge (by reference to the printed content on the page). In this way it becomes possible to determine the orientation (landscape, portrait) of a sheet by reading its, say, right edge code. Additionally, the recto can be differentiated from the verso if a code reader device provides also the order in which the ream and sheet codes appeared (which one was first). By convention, the code identifying a sheet may be read on its right edge and, say, from the top to the bottom (again by reference to the printed content on the page).

In the method described in FIG. 1, describes collating N reams of N1 sheets at a time, where N is the number of sheets per final ream. In the method of FIG. 1, N1 may be greater than, less than or equal to N. For convenience, a user may select to make N1 equal to N. Since a typical ream contains 500 sheets, it may be technically difficult to deal with 500 reams of 500 sheets at a time. Some of the difficulty can be lessened by making N1 less than N, say by choosing N such that N1 times N2, an integer=N (for instance, 25*20=500).

Figure 4:
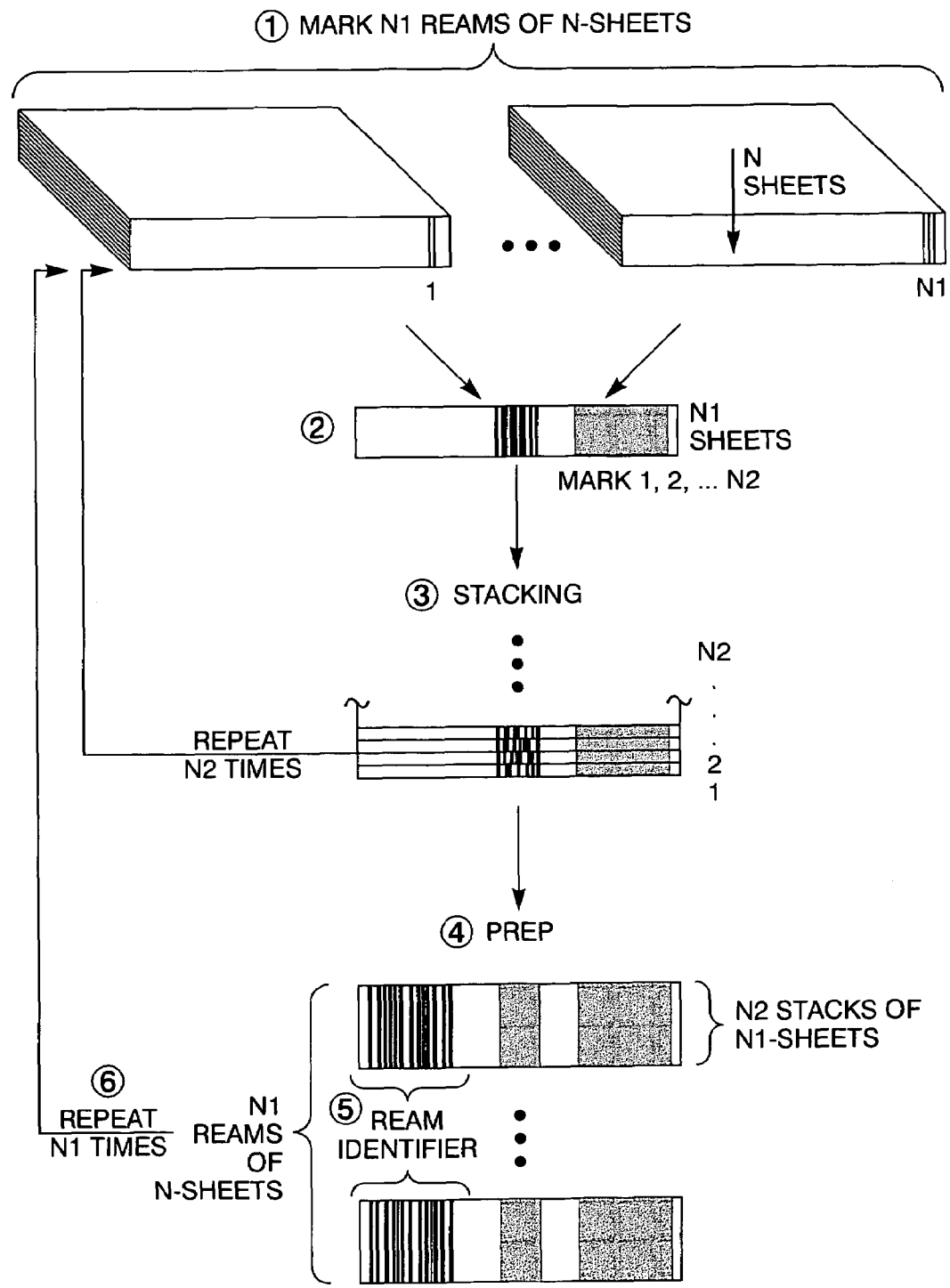
FIG. 4 is a schematic of an alternative method of edge marking.

An alternative method of marking a unique code onto an edge of a sheet of material uses a third barcode. Rather than numbering the sheets using one single code, sheets are numbered using several codes, forming a compound sheet numbering scheme. By combining these codes, the actual sheet number in the ream can then be computed. Referring to FIG. 4, a schematic diagram of an alternative method of marking a unique code onto an edge of a sheet of material is shown. Choose two positive integers N1 and N2 so that N1 times N2=N, where N is the number of sheets in a final ream (typically 500).

In step 1, N1 reams of N sheets are marked with a unique sheet identifier code. These codes can be arbitrary or consecutive numbers in the range [1, N1]. If edge marking is to be included, these codes can be in the range [1, 4*N1] for the orientation. In step 2, a single smaller ream of N1 sheets is created from the N1 marked reams by taking one sheet from each of the N1 reams. Sheets are taken in the same fixed order, e.g., top-down, from all N1 marked reams. This is repeated until N2 reams of N1 sheets each have been collated from the first sheet in each of the N original reams. In step 3, each of the N2 collated reams is marked on the same edge with a second unique identifier code. These codes can be arbitrary or consecutive in the range [1, N2]. In step 4, the N2 reams are stacked to form a single ream of N sheets. Note that each sheet of material in the stack has a unique sheet identifier code formed by the sheet identifier codes in steps 1 and 3. At the end, the single stack constitutes a ream of N sheets, made of N2 blocks of N1 sheets. In step 5, this ream is uniquely identified by a code holding a ream identifier, in the range [1, ∞], and is ready for use. In step 6, steps 2 to 5 are repeated N1 times to obtain N1 reams of N sheets each. At the end N1 reams have been completely marked, i.e., they hold three codes: one for the unique ream identifier and two to number the sheets in each ream. This alternate method reduces the amount of physically buffered reams, which is now N1.

This, however, occurs at the price of additional paper manipulations. More precisely, marking a ream with the main method requires grabbing a sheet of paper N times, while the alternate method above requires some stacking and 2*N grabs (or less if the intermediary stacks can be handled as a whole). Another potential drawback for the alternative method is the number of required barcodes: three instead of two in the main method. The more barcodes, the more difficult it may be for a reading device (the reading device must be slightly more complex). The increased space used on the edge is not really an issue, since there is plenty of room regarding the coding needs.

N1 and N2 can be selected to improve printing and collating efficiency. N1 determines the number of initial ream buffering, which should be minimized. But N1 also determines the thickness of the incomplete ream marked at step 1 (respectively 3), which should be large enough for marking purposes. N2 has no particular impact on the ream operational marking process.

The foregoing methods are exemplary only; compound numbering can be generalized to more than two codes.

The methods of marking a unique code onto an edge of a sheet of material, as described, can be used to reliably mark a unique edge code on each of up to four edges of the sheet of material. Different determined codes can be reliably marked on the four edges of any given sheet of material, which if coupled with a spatial convention for reading can determine the orientation of the read sheet. The codes can be exclusively composed of barcodes, and therefore benefit from the large barcode industrial expertise regarding their robustness and their reading.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of marking a unique code onto an edge of a sheet of material, comprising:

providing N1 stacks of sheet material, each stack having N2 sheets of sheet material, where N1 times a number N2=N;

defining a unique first identification code for each of the N1 stacks of sheet material;

for each of the N1 stacks, printing a first barcode corresponding to the each of the N1 stack's unique first identification code on at least one edge of the stack so that each sheet of sheet material in the stack has the first barcode printed on its edge;

collating the N1 stacks of sheet material to form N2 stacks, wherein each of the N2 collated stacks has N1 sheets of sheet material, one sheet from each of the N1 stacks of sheet material;

defining a unique second identification code for each of the N2 stacks of sheet material;

for each of the N2 stacks, printing a second barcode corresponding to the each of the N2 stack's unique identification code on at least one edge of the stack so that each sheet of sheet material in the stack has the second barcode printed on its edge;

forming a single ream comprising the N2 stacks;

printing a third identification code on at least one edge of the ream so that each sheet of sheet material in the ream has the third identification code printed on its edge; and wherein each sheet of material in the ream has indicia arranged on a least one edge to form a code uniquely identifying the sheet of material.

2. The method of claim 1, wherein the first barcode is printed on four edges of each stack.

3. The method of claim 2, wherein the second barcode is printed on four edges of each stack.

* * * * *